Dec. 13, 1966  H. F. WEINERT  3,291,518
VALVE
Filed Sept. 14, 1964
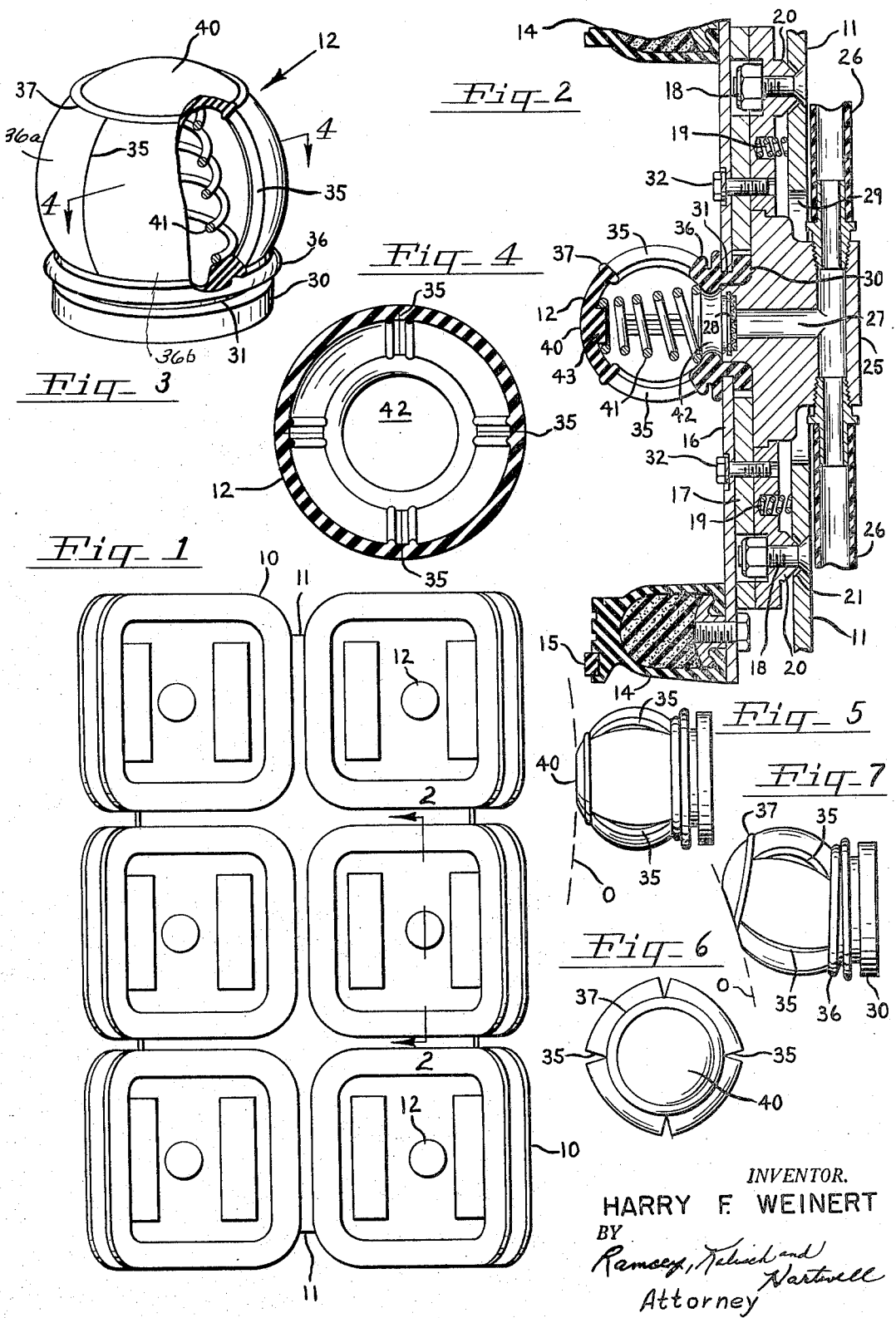
INVENTOR.
HARRY F. WEINERT
BY
Ramsey, Yalick and Nartvell
Attorney

United States Patent Office 3,291,518
Patented Dec. 13, 1966

3,291,518
VALVE
Harry F. Weinert, Portland, Oreg., assignor to Cascade Corporation, Portland, Oreg., a corporation of Oregon
Filed Sept. 14, 1964, Ser. No. 396,322
5 Claims. (Cl. 294—64)

This invention relates to improvements in valves. In a particular embodiment of the invention, the valve may control the vacuum supply to a suction cup used to lift and carry an object when the mouth of the suction cup is brought into engagement with the object.

Suction cups are often used in the material handling art for picking up and transporting objects. For example, suction cups provide a convenient means on a lift truck for grasping and carrying paper rolls and other articles, without any pallets. The holding and lifting power of the suction cup is derived from a vacuum connected to the cup whereby air is evacuated from the cup and an object is held securely against the mouth of the cup by atmospheric pressure. Where a valve means is provided to control the application of a vacuum to the cup, a vacuum supply may be conserved, by having the cup connected to a vacuum source only at such times as it is desired actually to lift and hold an object.

In order to lift large and ponderous objects, a plurality of suction cups may be included in a lifting device. Then, when a smaller object is to be lifted, some of the cups may be left open to the atmosphere. In such a case, vacuum should be shut off from those cups which are not covered by the object, in order that proper vacuum conditions be maintained in those cups which do embrace the object. Individual valves which open automatically by engagement of each suction cup with the article to be lifted, are desirable, therefore, to conserve vacuum in a system when one or more cups are not engaged with an object.

Automatic valves heretofore proposed for this purpose have been expensive and complicated, and subject to damage by the relatively rough treatment normally experienced by material handling equipment. Also, many have rendered vacuum handling systems slow acting, and unable to provide a quick grasp of the object to lift it.

Among the objects of the present invention, therefore, is the provision of a valve for the purpose described, which will overcome the shortcomings and disadvantages of conventional valves.

A further object is to provide a valve having fast response when an object to be lifted is engaged by a suction cup.

Another object is to provide a valve which opens and closes easily and positively, and which when closed will maintain a vacuum in all the pipe lines and hose connections found in the usual vacuum lift.

Another object is to provide an inexpensive and durable, positive-acting valve for controlling vacuum supply to each suction cup.

The present valve may comprise a slitted hollow elastomer body, within the confines of a suction cup, with the inside of the body communicating with a vacuum source. The slits are normally closed, and held closed by atmospheric pressure acting on the outside of the body. The body is positioned for engagement by an object to be lifted, just as the suction cup embraces the object, and such engagement distorts the body, causing the slits to open and connect the suction cup with the vacuum source. With the valve, the cup may be energized very rapidly. A suction cup system is made operable with a relatively small capacity suction pump, thereby reducing cost of the equipment.

The invention will be better understood and additional objects and advantages will become more fully apparent from the following description, to be read in conjunction with the accompanying drawings, wherein:

FIG. 1 is a front elevation view of a suction cup assembly in a material handling apparatus, each suction cup in the assembly having a bump valve embodying the invention;

FIG. 2 is a cross sectional view, taken generally along the line 2—2 in FIG. 1, and on a somewhat larger scale;

FIG. 3 is a perspective view of a valve with parts broken away, on an even larger scale;

FIG. 4 is a cross sectional view, taken generally along the line 4—4 in FIG. 3; and FIGS. 5, 6 and 7 are various views showing operation of the valve contemplated.

In FIG. 1, six suction cups 10 are shown mounted on a common equalizer plate 11. The equalizer plate 11 is adapted to be mounted on a lifting and carrying device, such as the lift carriage present in a lift truck. By way of example, there is illustrated a vacuum roll grab for lifting and carrying large rolls of paper, and for this purpose the suction cups 10 as well as equalizer plate 11 are curved so that the rims of the suction cups will fit the curvature of a cylinder of predetermined diameter standing on end. Such suction devices, however, are not limited to lift trucks nor to use with cylindrical objects, but may be used with equal facility on other material handling equipment and for objects having a flat side of sufficient extent to close and seal against the open sides of the suction cups. For grasping a flat-sided object, the suction cups would be flat instead of curved and the invention is applicable to any shape of suction cup which may be used.

It will be apparent that some form of valve device is desirable for controlling the application of vacuum to the individual cups. In the first place, it is uneconomical to pump air continuously through the suction cups when an object is not being carried and, in the second place, some objects to be carried may not be of sufficient size to cover all of the suction cups. For example, a short roll of paper may cover only the lower cups and leave the upper cups open to the atmosphere. This would reduce the vacuum available for the lower cups, so that they would not have the holding power to pick up and carry an object. The present invention is directed to a novel bump valve 12 mounted with the boundaries of each suction cup, operable to apply vacuum to the cup only when it is engaged by an article to be lifted, the valve closing off the vacuum supply when an article is not so engaged.

As shown in FIG. 2, each suction cup has a resilient rim 14 forming a mouth for the cup equipped with a relatively soft face seal 15 both shaped to fit the surface contour of the object to be lifted. The present cups are curved in plan view to fit a cylindrical object. The back of the cup is closed by a metal back plate 16 which is connected to a heavier support plate 17. Support plate 17 is resiliently mounted on the common equalizer plate 11 by means of bolts 18 and springs 19. Relative movement between the cup and equalizer plate is provided by allowing clearance between conical bosses 20 on the support plate and conical recesses 21 in the equalizer plate, these bosses and recesses being concentric with the bolts 18. The springs 19 normally hold the cup spaced as far from the equalizer plate as the bolts 18 will allow but when the whole assemblage shown in FIG. 1 is moved into contact with an object to be lifted, the cups will yield individually so that the seals 15 will engage the object entirely around the rim of the cup and seal the cup from atmosphere.

Each cup is provided with at least one valve adapter 25 having connections with sections of a vacuum hose 26 which extend to all of the suction cups shown in FIG. 1. The vacuum hose is connected to a suitable source of vacuum such as a pump. A passageway or port 27 equipped with a screen 28 establishes vacuum communication with the interior of valve 12. Adapter 25 projects through an opening 29 in equalizer plate 11.

Valve 12 comprises a hollow, substantially spherical body of flexible and resilient material such as rubber or other elastomer, and has a circular base flange 30 provided with an annular groove 31. Thus, the base flange may be distorted to pass through a circular opening in back plate 16. This opening in the back plate is defined by an edge which fits within groove 31. The parts are clamped together in an airtight joint by screws 32, the base flange 30 of the valve being sealed directly against valve adapter 25.

In the embodiment of the invention illustrated, the valve body has a plurality of circumferentially distributed slits 35 provided in its sides, extending in radial planes perpendicular to the general plane of base portion 30 and perpendicular to the general plane of the mouth of the cup 10. The slits are defined between adjacent side wall portions in the valve body, such as side wall portions 36a, 36b shown in FIG. 3. These slits extend substantially from an inner peripheral bead or ridge 36 adjacent the base portion to an outer peripheral bead or ridge 37 near the outer end of the body, leaving an imperforate outer end portion 40. Ridges 36, 37 inhibit tearing tendencies at the ends of the slits. Preferably, a coiled compression spring 41 is employed to hold the outer end extended and assist in maintaining the slits normally closed. The inner end of spring 41 seats against the interior wall of the body, about its base opening 42, and the spring's outer end is centered by an interior boss 43 in the center of end portion 40. End 40 projects slightly from the mouth of cup 10, as shown in FIG. 2, so that it will be depressed by an object embraced by the cup.

The slits 35 are normally closed because no material is removed in making the slits and, in addition, they are forceably held closed by the action of spring 41, and by the action of atmospheric pressure when the inside of the valve is evacuated. When the mouth of the suction cup is brought into engagement with an object to be lifted, indicated at 0 in FIGS. 5 and 6, the valve body is deformed either by forces exerted perpendicular to its base plane as shown in FIG. 5 (or perpendicular to the plane of the mouth of the cup), or applied obliquely as shown in FIG. 7. Any such distortion of the valve body from any angle opens one or more of the slits 35 to exhaust the air from the suction cup. End wall 40 (which constitutes a part or a wall portion in the valve body which is deflectable both perpendicularly to the plane of the mouth of the cup and obliquely to this plane or laterally toward any side of the cup) is sufficiently thick and stiff that it will not deflect without opening of the slits. The resilience of the cup rim portion 14 allows the cup to flatten somewhat when an article is held onto, causing the end portion 40 of the valve body to be depressed by the article even more, whereby the slits are held open a sufficient amount to insure that the full clamping and lifting power of the cup will be developed and maintained. The valve body may be of any shape, and the slits of any configuration, that will accomplish the described mode of operation. The slits thus constitute vacuum establishing means in the construction.

If the object to be lifted is not large enough to be embraced by all the suction cups, the valves which are not deflected will not be opened and the vacuum in the active cups will not be impaired. Release of the suction cups is accomplished by a main valve (not shown) under the control of the operator, momentarily shutting off suction and admitting atmospheric pressure into suction hose 26.

An important advantage of the present valve arrangement is that the various lines and conduits in the system do not have to be exhausted of air before vacuum is established in the cups 10, as is the case when the controlling valve is remote from the cups. In the present system, the valve bodies 12, hose lines 26 and all of the rest of the piping in the system constitute a vacuum reservoir which is available to apply vacuum instantly to any suction cup which is covered by an object to be lifted. This is the result of having individual control valves directly within the suction cups themselves. Only the small volume of the cups has to be exhausted of air.

By making the suction cups faster acting, time is saved in material handling operations and, by utilization of the vacuum storage capacity of the system, a smaller pump may be used which is less expensive and requires less power to operate. It will be appreciated that once the cups have clamped onto an object, there is relatively little air flowing through the system, and the pump is required only to maintain the degree of vacuum that has been established.

The present valves 12 are inexpensive and are of rugged construction, and are not easily damaged with rough handling. There is no elaborate control system; each valve is complete in itself and fully automatic in response to mere contact with a load. The valves are totally resilient in all directions making them certain of operation without requiring careful manipulation of the transporting vehicle.

While an embodiment of the invention has been described, it is appreciated that various changes and modifications may be made without departing from the invention. It is desired to cover all such changes and variations as would be apparent to one skilled in the art, and that come within the scope of the appended claims.

It is claimed and desired to secure by Letters Patent:

1. A bump valve for controlling the application of a vacuum comprising a generally spherical, hollow, resilient, elastomer body, having a supporting base portion with an opening therein for communication with a vacuum source, said body including multiple side wall portions spaced from each other extending around the body which are convexly curved on the outside of the body, a plurality of normally closed slits defined between said side wall portions of the body extending generally perpendicularly to said base portion adapted to be opened up when said body is deformed, and a compression spring in said body arranged to tension the body in the direction of said slits.

2. The valve defined in claim 1, wherein an end of said spring is seated on said base portion, and said body has an internal boss opposite said base portion for seating the end of said spring opposite the spring's said one end.

3. Suction apparatus for carrying an object comprising
 a suction cup including a mouth for attaching to an object,
 a port within the confines of said cup supplied with a vacuum, and
 mechanism controlling air flow through said port comprising a part arranged for actuation by an object approaching the cup to be embraced by its mouth, which part is deflectable both perpendicularly to the plane of the mouth of the cup, and obliquely to this plane laterally toward any side of the cup, and vacuum establishing means operatively connected to said part normally closing off said port from the interior of the suction cup, said means on any of such deflection occurring in said part operating to open up said port to the interior of the cup.

4. The apparatus of claim 3, wherein said mechanism comprises a hollow valve body with an interior communicating with said port, said part comprises a first wall portion in said body, said body has additional wall portions that are flexible and deformable, and said vacuum establishing means comprises slit means defined between said additional wall portions arranged so as to be opened up both on deformation of said additional wall portions perpendicularly to the plane of the mouth of the cup and by deformation of said additional wall portions obliquely to this plane laterally toward any side of the cup.

5. The apparatus of claim 3 wherein said mechanism comprises a hollow valve body including exteriorly convex, flexible, side wall portions, and said vacuum establishing means comprises a slit defined between said exteriorly convex side wall portions so arranged as to tend to be closed by atmospheric pressure outside the valve body with a vacuum existing inside said body.

References Cited by the Examiner
UNITED STATES PATENTS

| | | | |
|---|---|---|---|
| 2,617,625 | 11/1952 | Twyman | 137—525.1 |
| 2,715,038 | 8/1955 | Billner | 294—65 |
| 2,819,806 | 1/1958 | Vieth | 294—65 X |
| 2,946,342 | 7/1960 | Dopplmaier | 137—525 X |

FOREIGN PATENTS 1,301,646   7/1962   France.

GERALD M. FORLENZA, *Primary Examiner.*

G. F. ABRAHAM, *Assistant Examiner.*